United States Patent
Daishaku

(10) Patent No.: US 10,049,703 B2
(45) Date of Patent: Aug. 14, 2018

(54) DATA REPRODUCTION APPARATUS, CONTROL METHOD FOR DATA REPRODUCTION APPARATUS, AND RECORDING MEDIUM STORING CONTROL PROGRAM

(71) Applicant: Olympus Corporation, Hachioji-shi, Tokyo (JP)

(72) Inventor: Yasutaka Daishaku, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/165,977

(22) Filed: May 26, 2016

(65) Prior Publication Data

US 2016/0267945 A1    Sep. 15, 2016

Related U.S. Application Data

(63) Continuation of application No. PCT/JP2015/059161, filed on Mar. 25, 2015.

(30) Foreign Application Priority Data

Sep. 5, 2014    (JP) ................. 2014-181644

(51) Int. Cl.
*H04N 5/775* (2006.01)
*H04N 9/80* (2006.01)
(Continued)

(52) U.S. Cl.
CPC .......... *G11B 27/102* (2013.01); *G06F 3/0488* (2013.01); *G06F 3/04842* (2013.01);
(Continued)

(58) Field of Classification Search
USPC ........................................ 386/230, 239–248
See application file for complete search history.

(56) References Cited

U.S. PATENT DOCUMENTS

2007/0136679 A1*   6/2007   Yang ................. H04N 5/44513
                                                                  715/772
2009/0094534 A1    4/2009   Murat
(Continued)

FOREIGN PATENT DOCUMENTS

CN    103220580    7/2013
JP    8-305617    11/1996
(Continued)

OTHER PUBLICATIONS

Japanese Office Action to corresponding Japanese Patent Application No. 2015-560888, dated Aug. 30, 2016, (5 pgs.) with translation (4 pgs.).
(Continued)

*Primary Examiner* — Hung Dang
(74) *Attorney, Agent, or Firm* — John C. Pokotylo; Pokotylo Patent Services

(57) ABSTRACT

A data reproduction apparatus includes a display, a touch panel, a recording unit, an output unit, a display control unit, and an output controller. The output unit outputs contents recorded in the recording unit. The display control unit controls the display to show first display and second display. The first display represents a finite time period and a reproduction point indicating a reproduction target in relation to the finite time period. The second display represents a partial period which is part of the finite time period, and the reproduction point in relation to the partial period. The output controller controls the output unit to output the contents corresponding to the reproduction point in accordance with a touch position detected by the touch panel, when the touch position is on the first display or on the second display.

16 Claims, 12 Drawing Sheets

(51) Int. Cl.
| | |
|---|---|
| G06F 3/00 | (2006.01) |
| G11B 27/10 | (2006.01) |
| G06F 3/0488 | (2013.01) |
| G06F 3/0484 | (2013.01) |
| G09G 5/14 | (2006.01) |
| G11B 27/34 | (2006.01) |
| H04N 5/232 | (2006.01) |
| H04N 5/77 | (2006.01) |
| G06F 3/147 | (2006.01) |

(52) U.S. Cl.
CPC .......... *G06F 3/04847* (2013.01); *G06F 3/147* (2013.01); *G09G 5/14* (2013.01); *G11B 27/34* (2013.01); *H04N 5/23216* (2013.01); *H04N 5/23245* (2013.01); *H04N 5/23293* (2013.01); *H04N 5/772* (2013.01); *G09G 2354/00* (2013.01)

(56) References Cited

U.S. PATENT DOCUMENTS

| | | | |
|---|---|---|---|
| 2012/0042246 A1 | 2/2012 | Schwesinger et al. | |
| 2012/0134641 A1 | 5/2012 | Kanbe | |
| 2012/0308204 A1* | 12/2012 | Hwang | G06F 3/04847 |
| | | | 386/241 |
| 2012/0323915 A1* | 12/2012 | Koshimae | G06F 17/30064 |
| | | | 707/737 |
| 2013/0191747 A1 | 7/2013 | Choi | |
| 2014/0033111 A1* | 1/2014 | Yoo | G06F 3/0482 |
| | | | 715/779 |
| 2014/0132547 A1 | 5/2014 | Adachi et al. | |
| 2014/0310598 A1* | 10/2014 | Sprague | G06F 17/30017 |
| | | | 715/716 |
| 2015/0373299 A1* | 12/2015 | Kritt | G11B 27/105 |
| | | | 386/344 |

FOREIGN PATENT DOCUMENTS

| | | |
|---|---|---|
| JP | 2004-104594 | 4/2004 |
| JP | 2006-164033 | 6/2006 |
| JP | 2009-093219 | 4/2009 |
| JP | 2012-044474 | 3/2012 |
| JP | 2012-234553 | 11/2012 |
| JP | 2013-012036 | 1/2013 |
| JP | 2013-529802 | 7/2013 |
| JP | 2013-149246 | 8/2013 |
| WO | WO 2013/018310 | 2/2013 |

OTHER PUBLICATIONS

Translation of the International Preliminary Report on Patentability ("IPRP"), including the Written Opinion of the International Searching Authority, to corresponding International Application No. PCT/JP2015/059161 PCT/JP2015/059161, dated Mar. 16, 2017 (8 pgs.).

International Search Report to corresponding International Application No. PCT/JP2015/059161, dated Jun. 2, 2015 (3 pgs.) with translation (2 pgs.).

Written Opinion of the International Searching Authority to corresponding International Application No. PCT/JP2015/059161, dated Jun. 2, 2015 (4 pgs.).

First Office Action corresponding to Chinese Patent Application No. 201580004468.0, dated Jun. 5, 2017 (7 pgs.), with translation (12 pgs.).

* cited by examiner

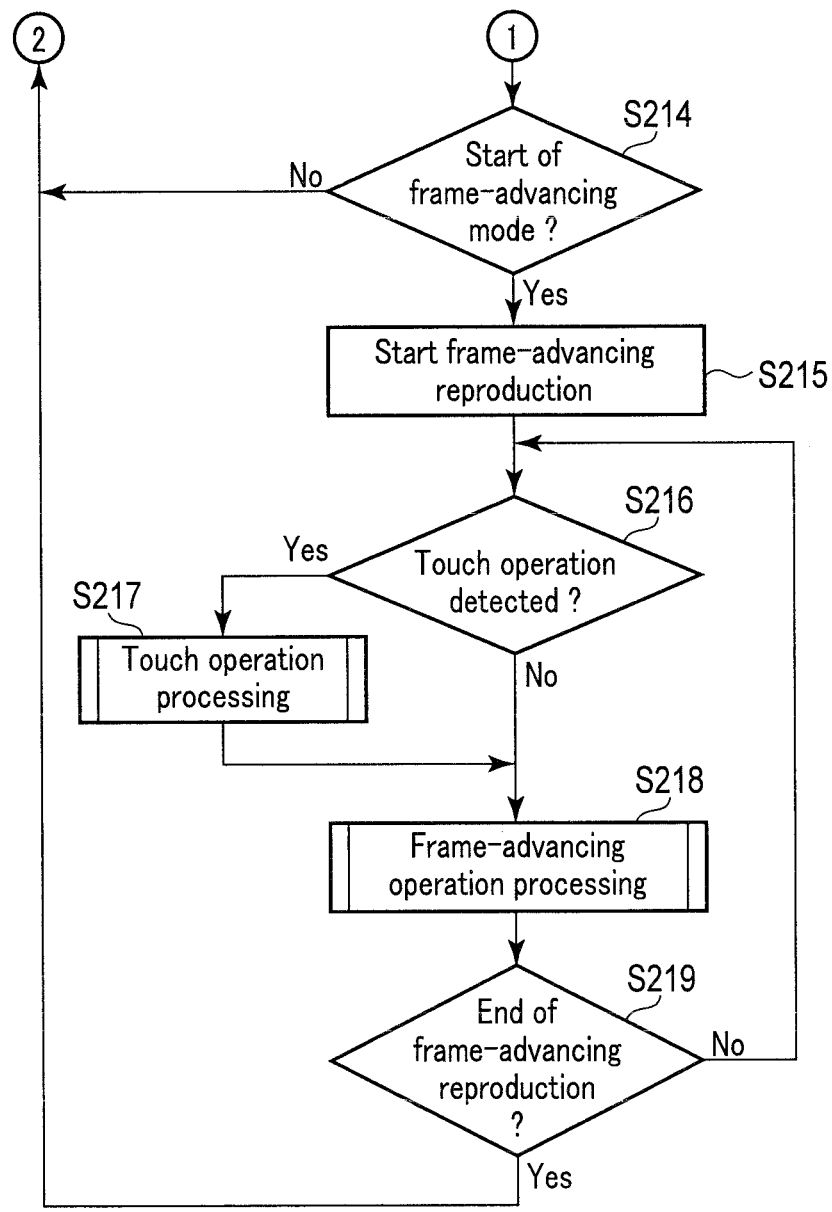
F I G. 3B

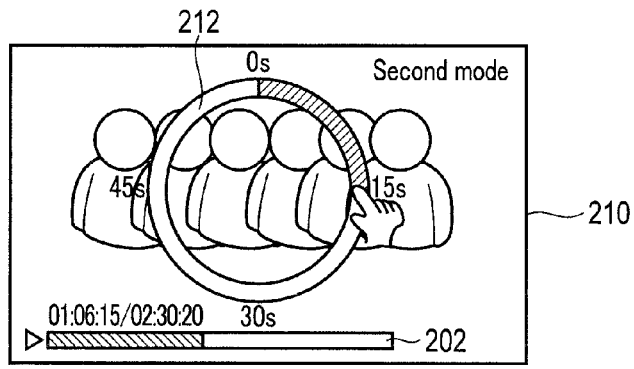
F I G. 7
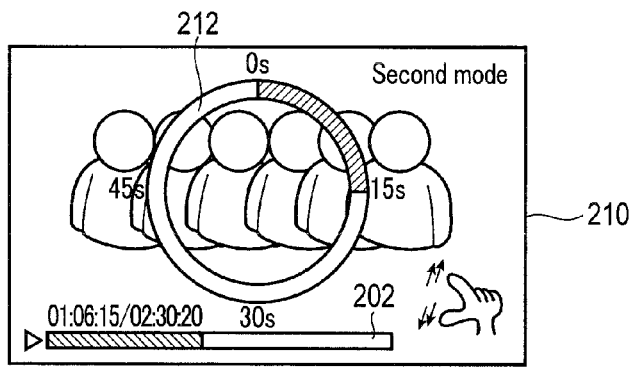
F I G. 8
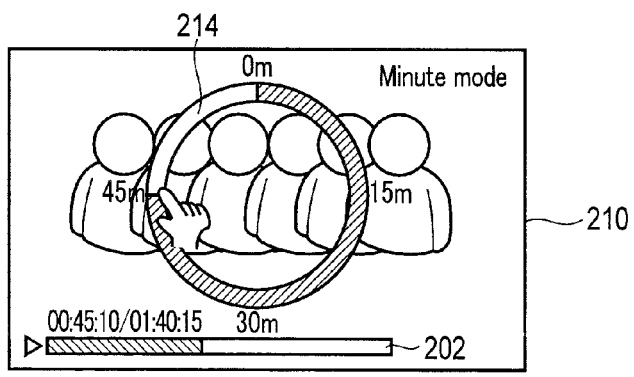
F I G. 9

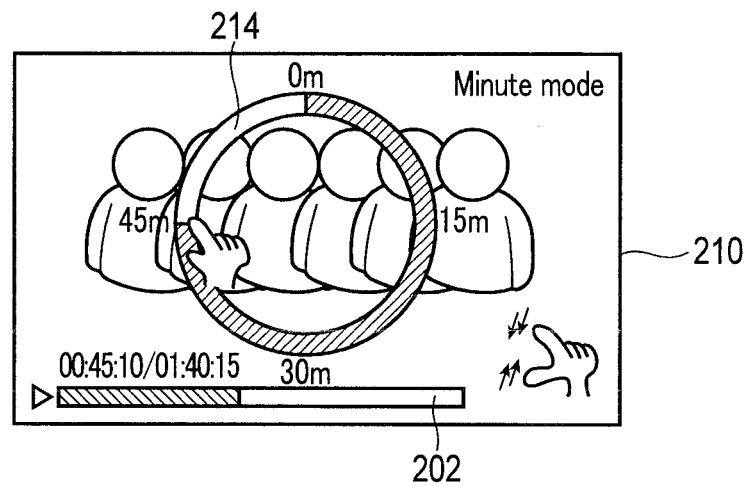
F I G. 10
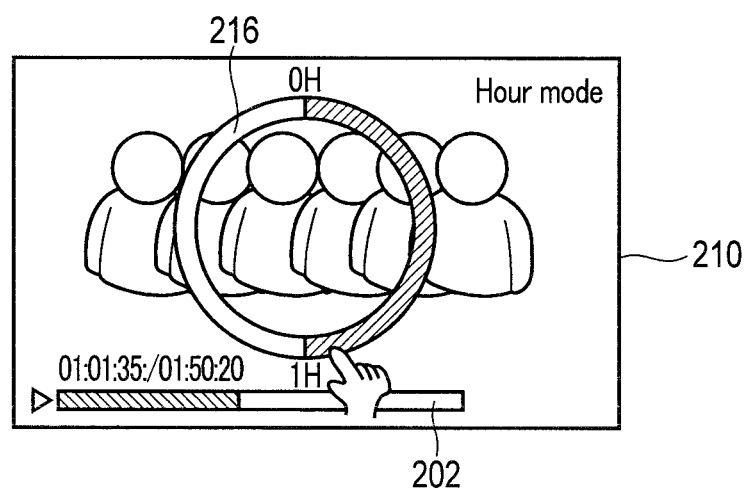
F I G. 11

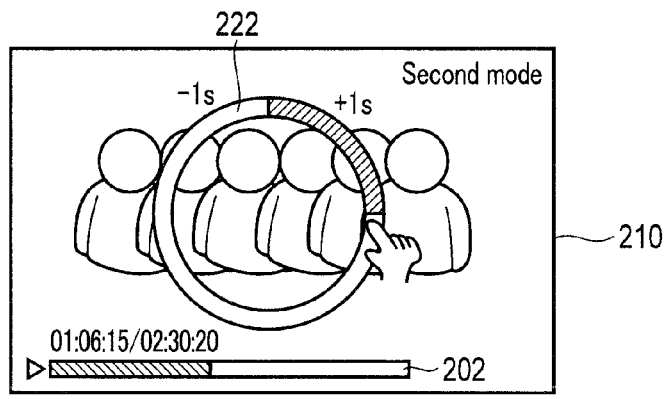
F I G. 17
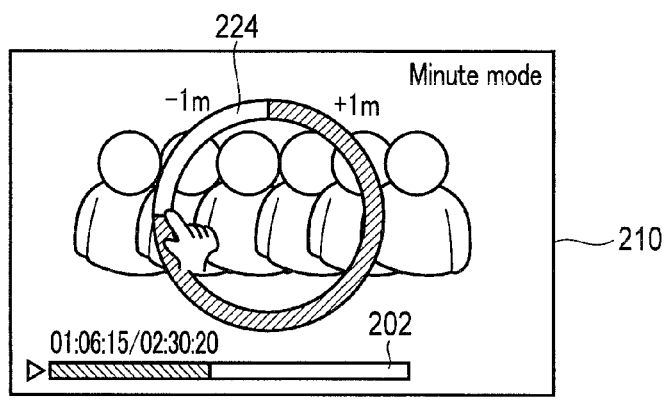
F I G. 18
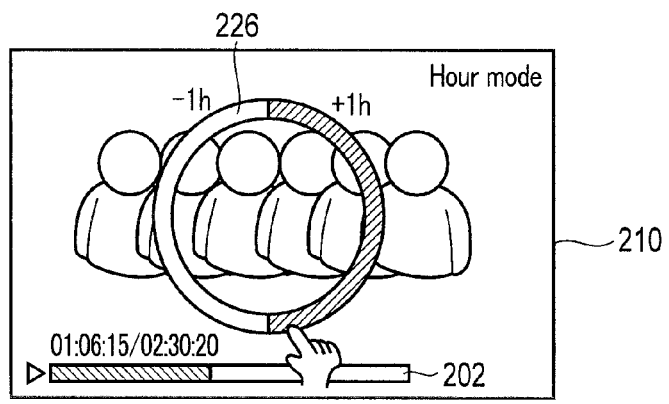
F I G. 19

DATA REPRODUCTION APPARATUS, CONTROL METHOD FOR DATA REPRODUCTION APPARATUS, AND RECORDING MEDIUM STORING CONTROL PROGRAM

CROSS-REFERENCE TO RELATED APPLICATIONS

This application is a Continuation application of PCT Application No. PCT/JP2015/059161, filed Mar. 25, 2015 and based upon and claiming the benefit of priority from prior Japanese Patent Application No. 2014-181644, filed Sep. 5, 2014, the entire contents of all of which are incorporated herein by reference.

BACKGROUND OF THE INVENTION

1. Field of Invention

The present invention relates to a data reproduction apparatus, a control method for the data reproduction apparatus, and a recording medium storing a control program.

2. Description of the Related Art

When a video is reproduced, the operations related to the reproduction operation can be performed using a touch panel, and an apparatus incorporating such a touch panel is known in the art. For example, Jpn. Pat. Appln. KOKAI Publication No. 2004-104594 discloses technology applicable to a digital camera and related to how a video is reproduced. Jpn. Pat. Appln. KOKAI Publication No. 2004-104594 discloses a so-called seek bar, which represents where the current reproduction position is in the whole length of a video. When the seek bar is touched, the video is reproduced from the frame corresponding to the touched position. Jpn. Pat. Appln. KOKAI Publication No. 2004-104594 discloses that a fast-forward operation and a fast-rewind operation are performed in accordance with the direction in which the user slides a finger on a touch panel and the speed at which the finger is slid.

In general, when the user wants to start the reproduction of a video from a desired frame, the desired frame cannot be easily selected using the seek bar, and detailed designation is hard to perform and is troublesome. This is so, particularly when the video is long and the long-time data is represented by a short seek bar. In such a case, the user cannot easily recognize which point of the video is actually designated. This problem is not limited to the reproduction operation of a video, and the same problem occurs when sound is reproduced.

BRIEF SUMMARY OF THE INVENTION

According to an aspect of the present invention, a data reproduction apparatus includes a display which displays an image; a touch panel which is provided for the display and detects a touched position as a touch position; a recording unit in which time data relating to a plurality of times included in a finite time period and contents associated with the time data are recorded; an output unit which outputs content, included in data recorded in the recording unit and selected as a reproduction target, based on the time data; a display control unit which controls the display to show first display and second display, wherein the first display represents the finite time period and a reproduction point indicating the reproduction target in relation to the finite time period, and the second display represents a partial period which is part of the finite time period, and the reproduction point in relation to the partial period, the second display being shown when a touch operation detected by the touch panel is a first touch operation; and an output controller which controls the output unit to output the content corresponding to the reproduction point in accordance with the touch position, when the touch position is on the first display or on the second display, wherein the display controller causes the second display to be shown in a region including an area in which the image is displayed.

According to an aspect of the present invention, a control method is a method for a data reproduction apparatus including a display which displays an image, a touch panel which is provided for the display and detects a touched position as a touch position, a recording unit in which time data relating to a plurality of times included in a finite time period and contents associated with the time data are recorded, and an output unit which outputs content, included in the data recorded in the recording unit and selected as a reproduction target, based on the time data. The control method includes causing the display to show first display representing the finite time period and a reproduction point indicating the reproduction target in relation to the finite time period; causing the display to show second display representing a partial period which is part of the finite time period, and the reproduction point in relation to the partial period, the second display being shown on a region including an area in which the image is displayed, when the touch operation detected by the touch panel is a first touch operation; and causing the output unit to output the content corresponding to the reproduction point in accordance with the touch position, when the touch position is on the first display or on the second display.

According to an aspect of the present invention, a non-transitory computer-readable recording medium stores a control program for controlling a data reproduction apparatus including a display which displays an image, a touch panel which is provided for the display and detects a touched position as a touch position, a recording unit in which time data relating to a plurality of times included in a finite time period and contents associated with the time data are recorded, and an output unit which outputs content, included in the data recorded in the recording unit and selected as a reproduction target, based on the time data. The recording medium stores code that causes the display to show first display representing the finite time period and a reproduction point indicating the reproduction target in relation to the finite time period; code that causes the display to show second display representing a partial period which is part of the finite time period, and the reproduction point in relation to the partial period, the second display being shown on a region including an area in which the image is displayed, when the touch operation detected by the touch panel is a first touch operation; and code that causes the output unit to output the content corresponding to the reproduction point in accordance with the touch position, when the touch position is on the first display or on the second display.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3B is a flowchart illustrating an example of reproduction operation processing according to the embodiment.

FIG. 7 shows an example of a display image according to the embodiment and illustrates an example of a "second"-setting adjustment circle.

FIG. 8 shows an example of a display image according to the embodiment for explaining a unit enlargement operation.

FIG. 9 shows an example of a display image according to the embodiment and illustrates an example of a "minute"-setting adjustment circle.

FIG. 10 shows an example of a display image according to the embodiment for explaining a unit reduction operation.

FIG. 11 shows an example of a display image according to the embodiment and illustrates an example of an "hour"-setting adjustment circle.

FIG. 17 shows an example of a display image according to the embodiment and illustrates another example of a "second"-setting adjustment circle.

FIG. 18 shows an example of a display image according to the embodiment and illustrates another example of a "minute"-setting adjustment circle.

FIG. 19 shows an example of a display image according to the embodiment and illustrates another example of an "hour"-setting adjustment circle.

DETAILED DESCRIPTION OF THE INVENTION

Figure 1:
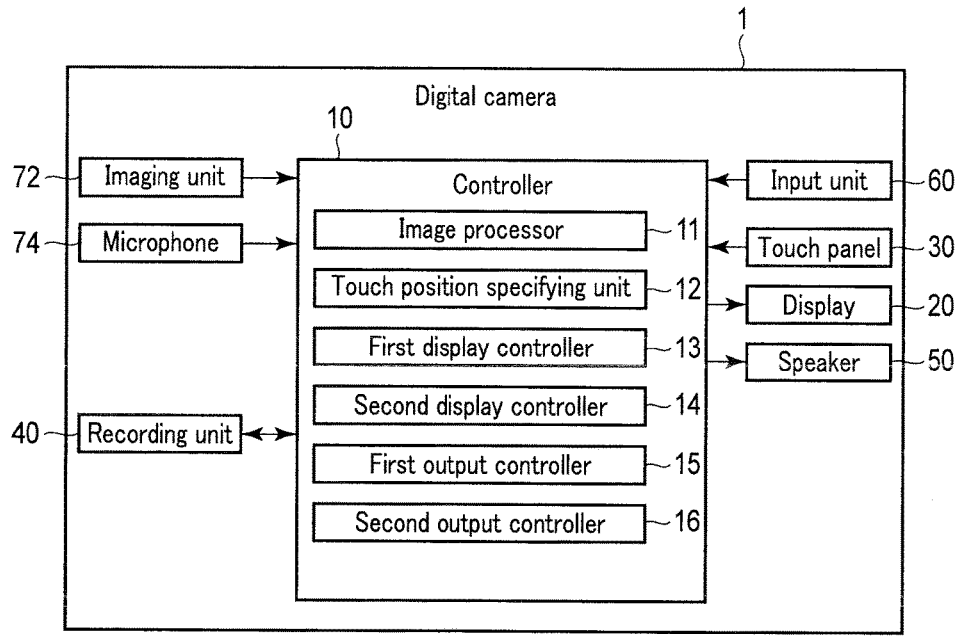
FIG. 1 is a block diagram schematically showing an exemplary configuration of a digital camera according to one embodiment.

One embodiment of the present invention will now be described with reference to the accompanying drawings. The present embodiment relates to a digital camera. FIG. 1 schematically shows an exemplary configuration of the digital camera of the present embodiment. As shown in FIG. 1, the digital camera 1 of the present embodiment comprises a controller 10, a display 20, a touch panel 30, a recording unit 40, a speaker 50, an input unit 60, an imaging unit 72 and a microphone 74.

The controller 10 controls the operation of each portions of the digital camera 1. The controller 10 includes a central processing unit (CPU), an application specific integrated circuit (ASIC) or the like, and performs various kinds of operation. The operation of the controller 10 is executed in accordance with a program stored in the recording unit 40.

The display 20 is, for example, a liquid crystal display. The display 20 displays various images under the control of the controller 10. The touch panel 30 is provided on the display 20 in conformity therewith. The touch panel 30 detects a touched position. The touch panel 30 supplies information on the touched position to the controller 10.

The recording unit 40 includes a general type of recording medium such as a semiconductor memory. The recording unit 40 stores a program required for the controller 10 to operate. The recording unit 40 also stores image information relating to the screen displayed on the display 20, as an on-screen display (OSD). The recording unit 40 further stores still images and videos captured by the digital camera 1. The recording unit 40 may include two separate recording mediums. One of them is a recording medium fixed to the digital camera 1 and storing programs or the like, and the other is a recording medium detachable from the digital camera and storing still images and videos. To store the still images and videos in large amounts, these images and videos may be stored in a recording unit different from that in which the OSD etc. are stored.

The speaker 50 is a general type of speaker and outputs sound under the control of the controller 10. The input unit 60 includes various buttons and dials, etc. The input unit 60 receives inputs by the user and supplies information on the inputs to the controller 10.

The imaging unit 72 includes a lens, an imaging element, etc. The imaging unit 72 generates an image signal based on a captured image and supplies the generated image to the controller 10. The microphone 74 is a general type of microphone. The microphone 74 receives ambient sound and generates a sound signal. The microphone 74 supplies the generated sound signal to the controller 10.

The video data stored in the recording unit 40 is temporal data having the following features. A video has a length of time, which is a finite time period. The video data includes image data and sound data corresponding to times included in the finite time period. In other words, the image data and sound data respectively correspond to the times included in the finite time period. When a video is reproduced or played based on the video data, a reproduction point within the finite time period gradually advances. The image corresponding to the reproduction time is displayed on the display 20, or the sound corresponding to the reproduction time is output from the speaker 50.

A more detailed description will be given of the controller 10. The controller 10 comprises an image processor 11, a touch position specifying unit 12, a first display controller 13, a second display controller 14, a first output controller 15 and a second output controller 16.

The image processor 11 performs various kinds of image processing. The touch position specifying unit 12 acquires a signal relating to a touched position from the touch panel 30, and analyses the information relating to the touched position.

The first display controller 13 displays, on the display 20, a seek bar as a first display which shows a finite time period representing the length of a video file and a reproduction point of time or a current reproduction position.

Based on the output from the touch position specifying unit 12, the second display controller 14 determines whether or not the seek bar is kept pressed for more than a predetermined period. If it is determined that the seek bar is kept touched for more than the predetermined time, the second display controller 14 displays, on the display 20, an adjustment circle as a second display which shows both a period of part of the video file and the reproduction point of time.

When the seek bar is touched, the first output controller 15 performs a reproduction operation corresponding to the touched position. To be more specific, the first output controller 15 controls the display 20 to display an image of a frame corresponding to the touched position of the seek bar, and controls the speaker 50 to output sound of that frame.

When the adjustment circle is touched, the second output controller 16 performs a reproduction operation corresponding to the touched position. To be more specific, the second output controller 16 controls the display 20 to display an image of a frame corresponding to the touched position of the adjustment circle, and controls the speaker 50 to output sound corresponding to that frame. As described above, the display 20 and the speaker 50 function as output units that output data corresponding to the reproduction point in the finite time period, based on the temporal data.

Figure 2:
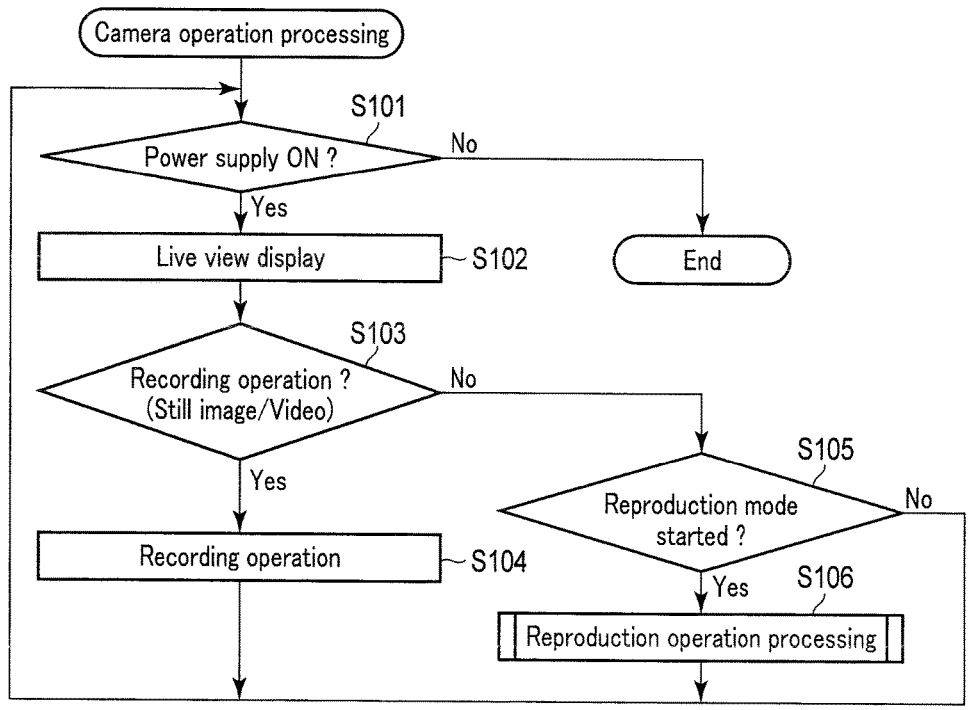
FIG. 2 is a flowchart illustrating an example of camera operation processing according to the embodiment.

A description will be given of how the digital camera 1 of the present embodiment operates. The camera operation processing performed by the controller 10 of the digital camera 1 will be described, referring to the flowchart shown in FIG. 2.

In step S101, the controller 10 determines whether or not the power supply is ON. If it is determined that the power supply is not ON, the camera operation processing is brought to an end. If it is determined that the power supply is ON, the processing flow advances to step S102.

In step S102, the controller performs a live view display. In other words, the imaging unit 72 performs an imaging operation for live viewing. The image processor 11 performs image processing for an obtained image and generates a live view image. The display 20 displays the generated live view image.

In step S103, the controller 10 determines whether or not a recording operation is performed. It should be noted here that the recording operation is, for example, the operation of depressing the release button of the input unit 60 to capture a still image or the operation of depressing the video button of the input unit 60 to capture a video. If it is determined in step 203 that the recording operation is performed, the processing flow advances to step S104.

In step S104, the controller 10 performs image recording. For example, if it is determined in step S103 that the release button is depressed, the recording of a still picture is started. At the time, the imaging unit 72 performs an imaging operation for capturing a still picture. The image processor 11 performs still picture processing for the obtained image. The recording unit 40 records data of the image for which the image processing is performed. If it is determined in step S103 that the video button is depressed, the recording of a video is started. At the time, the imaging unit 72 performs an imaging operation for capturing a video. The image processor 11 performs video processing for the obtained image. The recording unit 40 records data of the video for which the image processing is performed. After step S104, the processing flow returns to step S101.

If it is determined in step S103 that the recording operation is not performed, the processing flow advances to step S105. In step S105, the controller 10 determines whether or not the reproduction mode is started. For example, when the reproduction button is depressed, the reproduction mode is started. If it is determined that the reproduction mode should not be started, the processing flow returns to step S101. If it is determined that the reproduction mode should be started, the processing flow advances to step S106.

In step S106, the controller 10 performs reproduction operation processing. At the end of the reproduction operation processing, the processing flow returns to step S101.

Figure 3A:
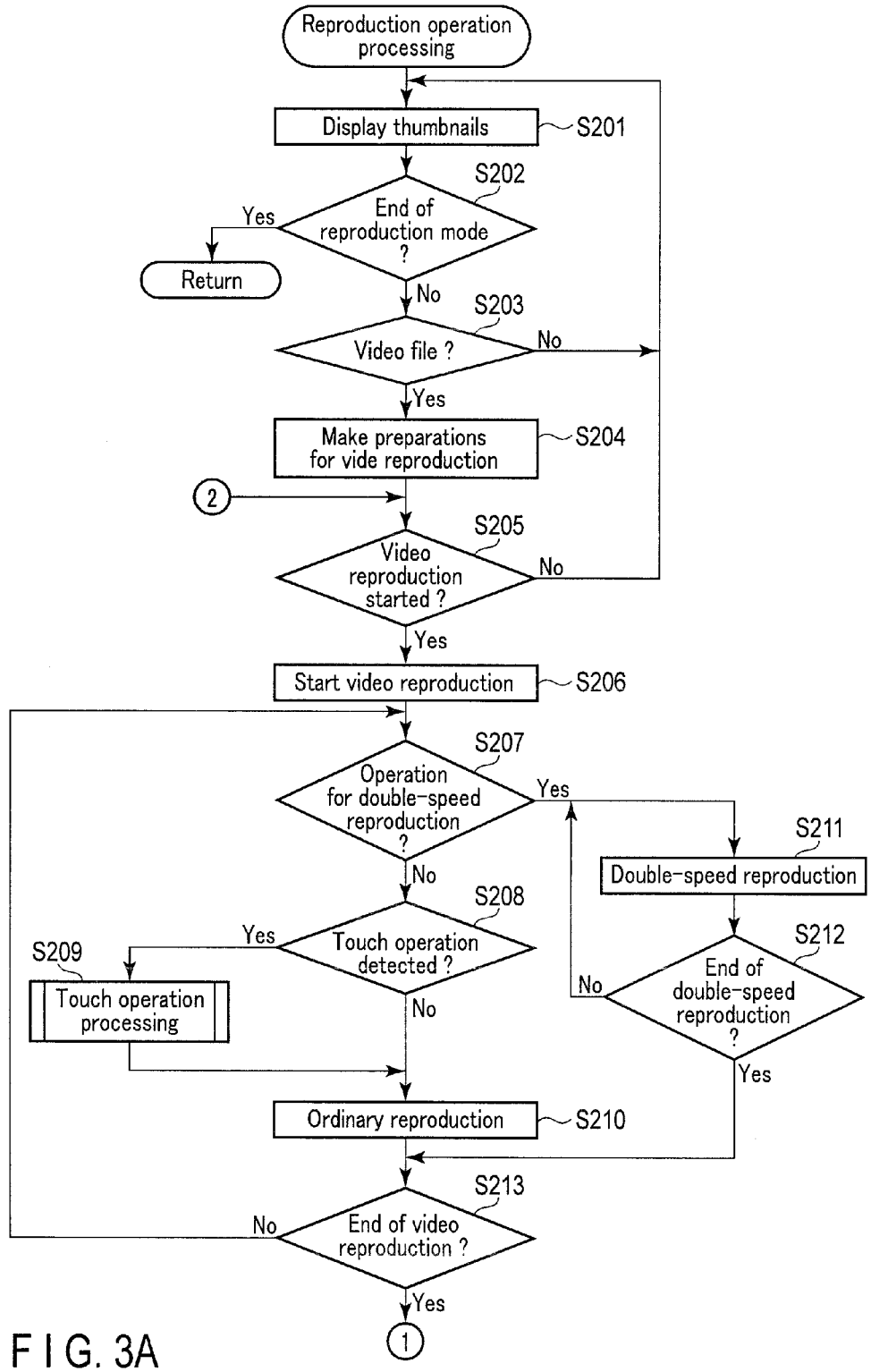
FIG. 3A is a flowchart illustrating an example of reproduction operation processing according to the embodiment.

The reproduction operation processing will be described with reference to the flowchart shown in FIGS. 3A and 3B.

In step S201, the controller 10 controls the display 20 to display thumbnail images. To be specific, thumbnail image data of the still images and videos recorded in the recording unit 40 are read from the recording unit 40, and thumbnail images are displayed on the display 20 as index images.

In step S202, the controller 10 determines whether or not the reproduction mode should be ended. For example, when the return button of the input unit 60 is depressed, the reproduction mode is ended. When it is determined that the reproduction mode should be ended, the reproduction operation processing is brought to an end, and the processing returns to the camera operation processing. If it is determined that the reproduction mode should not be ended, the processing flow advances to step S203.

In step S203, the controller 10 determines whether or not a video file is selected. For example, if the touch panel 30 detects that a thumbnail image corresponding to a video is touched, it is determined that the video is selected. If it is determined that the video file is not selected, the processing flow returns to step S201. If it is determined that the video file is selected, the processing flow advances to step S204. The video file includes not only a file for an ordinary kind of video but also a time-lapse video or a slow-motion video.

In step S204, the controller 10 makes preparations for the reproduction of a selected video. To be specific, the display 20 displays a still picture at the beginning of a video file and a reproduction start button.

In step S205, the controller 10 determines whether or not the reproduction start button is touched to select the start of video reproduction. If it is determined that the reproduction of a video file is not selected and that there is an input requesting the display of thumbnail images, then the processing flow returns to step S201. If it is determined that the reproduction of a video file is selected, the processing flow advances to step S206.

In step S206, the controller 10 starts the reproduction of a video. As a result, the video reproduction is started, and the video is displayed on the display unit 20. At the time, the seek bar (first display mentioned later) is displayed on the display 20.

In step S207, the controller 10 determines whether or not an operation for the double-speed reproduction is performed. If it is determined that the operation for the double-speed reproduction is not performed, the processing flow advances to step S208.

In step S208, the controller 10 determines whether or not the touch panel detects a touch, namely, whether or not the touch operation is performed. If it is determined that the touch operation is not performed, the processing flow advances to step S210. If it is determined that the touch operation is performed, the processing flow advances to step S209.

In step S209, touch operation processing is performed. In the touch operation processing, the processing corresponding to the touch position on the touch panel 30 and the manner in which the touch operation is performed is executed. The touch operation processing will be mentioned later. At the end of the touch operation processing, the processing flow advances to step S210.

In step S210, the controller 10 performs ordinary reproduction processing. In other words, the reproduction of an ordinary video is continued, and the video is displayed on the display unit 20. Subsequently, the processing flow advances to step S213.

If it is determined in step 207 that the operation for the double-speed reproduction is performed, the processing flow advances to step S211. In step S211, the controller 10 performs double-speed reproduction processing. That is, the video is reproduced at the double speed, and the video reproduced at the double speed is displayed on the display 20.

In step S212, the controller 10 determines whether or not an instruction for ending the double-speed reproduction is entered, namely, whether or not the double-speed reproduction should be ended. If it is determined that the double-speed reproduction should not be ended, the processing flow returns to step S211. That is, the double-speed reproduction is continued. If it is determined that the double-speed reproduction should be ended, the processing flow advances to step S213.

In step S213, the controller 10 determines whether or not an instruction for ending the reproduction of the video is entered, namely, whether or not the reproduction of the video should be ended. If it is determined that the reproduction of the video should not be ended, the processing flow returns to step S207. If it is determined that the reproduction of the video should be ended, the reproduction of the video is stopped temporarily, and the processing flow advances to step S214.

In step S214, the controller 10 determines whether or not an instruction for starting a frame-advancing mode is entered, namely, whether or not the frame-advancing mode should be started. If it is determined that the frame-advancing mode should not be started, the processing flow returns to step S205. If it is determined that the frame-advancing mode should be started, the processing flow advances to step S215.

In step S215, the controller 10 starts the frame-advancing reproduction of a video. Subsequently, the processing flow advances to step S216.

In step S216, the controller 10 determines whether or not a touch operation is performed. If it is determined that the touch operation is not performed, the processing flow advances to step S218. If it is determined that the touch operation is performed, the processing flow advances to step S217.

In step S217, the controller 10 performs touch operation processing. The touch operation processing performed in step S217 is similar to the touch operation processing performed in step S209. That is, it is touch operation processing in frame advancement. At the end of the touch operation processing, the processing flow advances to step S218.

In step S218, the controller 10 performs frame-advancing operation processing. The frame-advancing operation processing is to control the frame-advancing reproduction in response to an input entered from the operation button (arrow key) of the input unit 60. The frame-advancing operation processing will be mentioned later. At the end of the frame-advancing operation processing, the processing flow advances to step S219.

In step S219, the controller 10 determines whether or not an instruction for ending the frame-advancing reproduction is entered, namely, whether or not the frame-advancing reproduction should be ended. If it is determined that the frame-advancing reproduction should not be ended, the processing flow returns to step S216. If it is determined that the frame-advancing reproduction should be ended, the controller 10 causes the video reproduction to pause. Subsequently, the processing flow advances to step S205.

Figure 4:
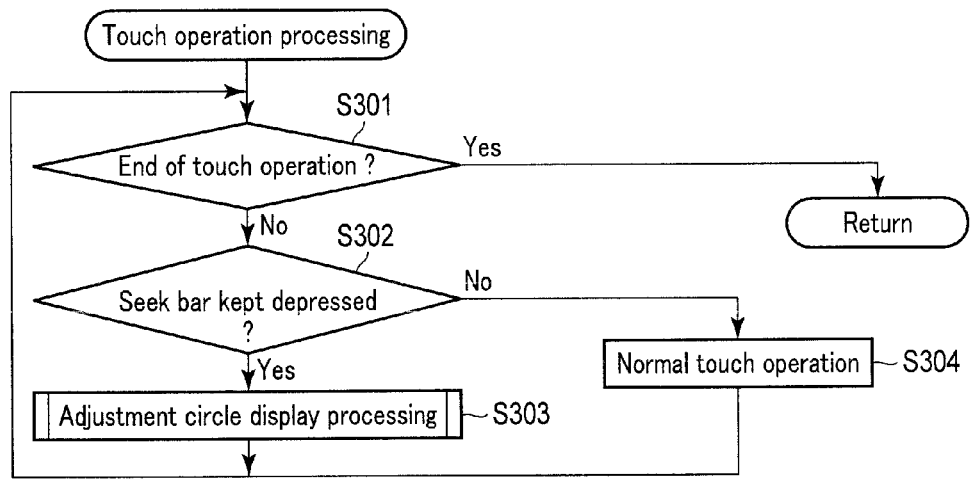
FIG. 4 is a flowchart illustrating an example of touch operation processing according to the embodiment.

The touch operation processing performed in steps S209 and S217 will be described, referring to the flowchart shown in FIG. 4.

In step S301, the controller 10 determines whether or not the touch operation has been performed. When the controller 10 determines that the touch operation has been performed, the touch operation processing is ended, and the processing flow returns to the reproduction operation processing. If it is determined that the touch operation is not ended, the processing flow advances to step S302.

Figure 5:
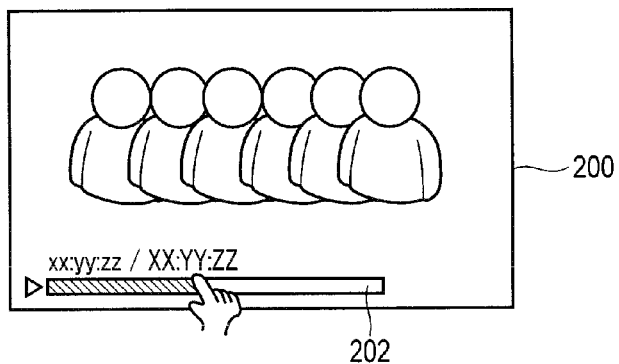
FIG. 5 shows an example of a display image according to the embodiment.

FIG. 5 illustrates an example of what is displayed on the display 20 during the reproduction of a video. As shown in FIG. 5, a seek bar 202 is shown in the screen 200 when the video is being reproduced. The seek bar 202 indicates the reproduction point of the video. The left end of the seek bar 202 corresponds to the initial frame of the video, and the right end of the seek bar 202 corresponds to the last frame of the video. When the video is reproduced, the slider indicated by oblique lines moves from left to right on the seek bar 202. The right end of the slider indicates the current reproduction point. The user can recognize the current reproduction point in the overall length of the video by looking at the position of the slider. As will be described later, when the seek bar 202 is touched, the reproduction of the video is started from the frame corresponding to the touched point on the seek bar 202 (step S304). In other words, the user can start the reproduction of the video from a desirable point by touching the seek bar 202.

In step S302, the controller 10 determines whether or not the seek bar 202 is kept depressed for more than a predetermined length of time. In other words, the controller 10 determines whether or not the touch on the seek bar 202 is continued for more than the predetermined length of time. If it is determined that the seek bar 202 is kept depressed for a long time, the processing flow advances to step S303.

In step S303, the controller 10 performs adjustment circle display processing. In the adjustment circle display processing, the adjustment circle is displayed, and a reproduction point is designated using the adjustment circle. The adjustment circle is a circular graphical user interface (GUI) that enables a reproduction point to be designated with higher accuracy than the seek bar 202. The adjustment circle display processing will be mentioned later. At the end of the adjustment circle display processing, the processing flow returns to step S301.

If it is determined in step S302 that the seek bar is not kept depressed for a long time, the processing flow advances to step S304. In step S304, the controller 10 performs a normal touch operation. At the time, the touch position specifying unit 12 of the controller 10 specifies which position of the touch panel is touched, and the controller 10 performs various operations in accordance with the position.

For example, when the seek bar 202 is touched, the reproduction of the video is started from the frame corresponding to the touched point. In accordance with the touched position and how the seek bar 202 is touched, the pause, fast-forward operation, fast-rewinding operation etc. of the video are performed. For example, an icon (not shown) corresponding to the pause is touched, the video pauses. At the end of the normal touch operation, the processing flow advances to step S301.

Figure 6:
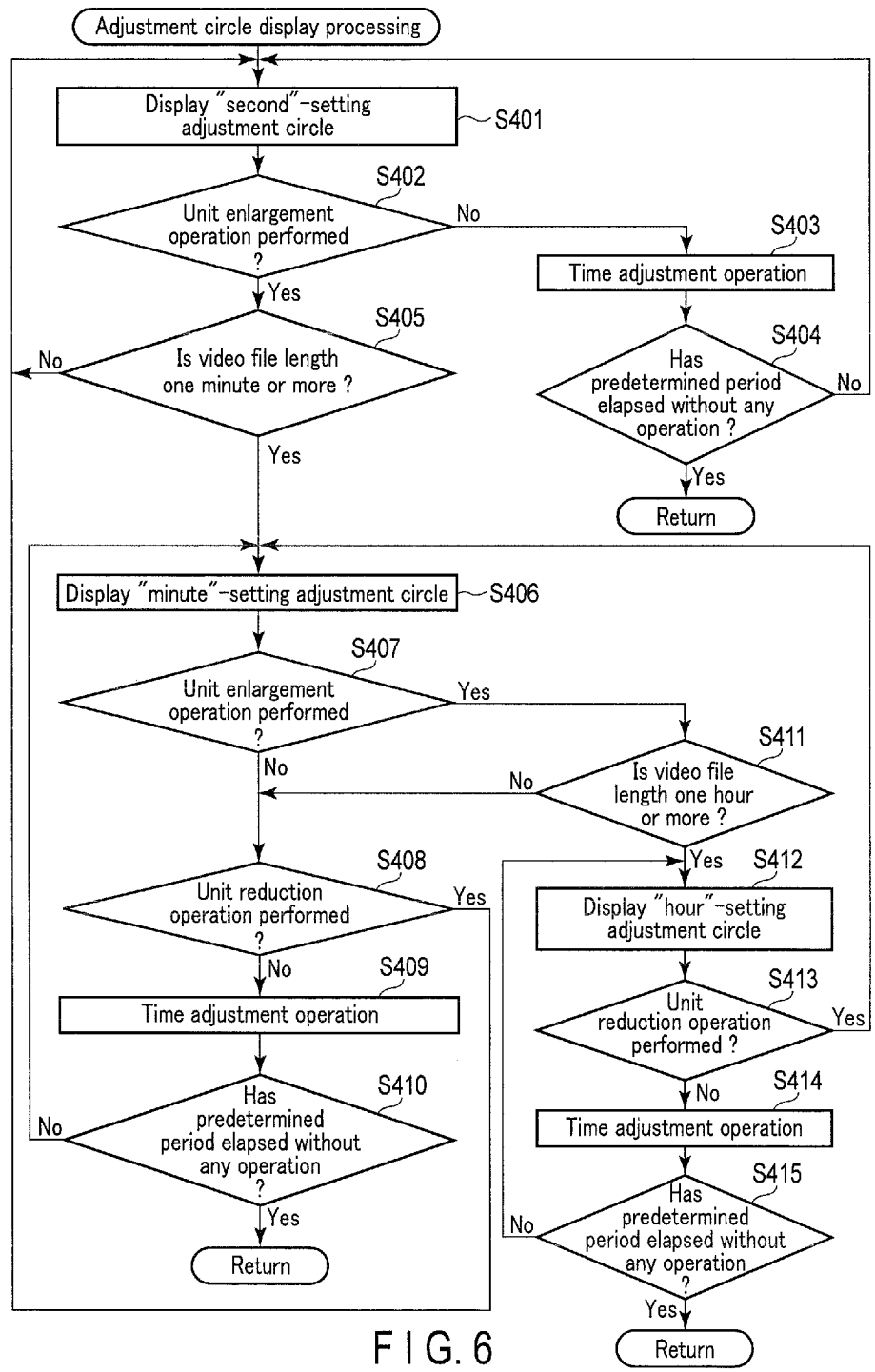
FIG. 6 is a flowchart illustrating an example of adjustment circle display processing according to the embodiment.

The adjustment circle display processing performed in step S303 will be described, referring to the flowchart shown in FIG. 6.

In step S401, the controller 10 displays a "second"-setting adjustment circle on the display 20. The "second"-setting adjustment circle enables adjustment to be made easily in units of seconds. FIG. 7 shows an example of the screen 210 on which a video is being reproduced, with the "second"-setting adjustment circle. As shown in FIG. 7, the seek bar 202 and the "second"-setting adjustment circle 212 are displayed in the screen 210 on which a video is being reproduced.

The "second"-setting adjustment circle 212 is a circular GUI, as shown in FIG. 7. As can be seen from FIG. 7, the adjustment circle has a shape obtained by deforming the seek bar as a circle. The adjustment circle has an opening inside so that the image or picture shown on the display 20 can be observed. Therefore, the picture being displayed can be observed when the adjustment circle is displayed. In the adjustment circle, the portion preceding the current reproduction point and the portion subsequent to the current reproduction point are displayed in different ways (e.g., in different colors), so that the user can easily recognize the current reproduction point of the video. The adjustment circle may be semitransparent. Where the adjustment circle is semitransparent, the image displayed on the display 20 can be observed as it is.

In the "second"-setting adjustment circle 212, the upward direction corresponding to the "0 o'clock" represents zero seconds, the rightward direction corresponding to the "3 o'clock" represents 15 seconds, the downward direction corresponding to the "6 o'clock" represents 30 seconds, and the leftward direction corresponding to the "9 o'clock" represents 45 seconds. For example, let us assume that a video file whose reproduction time is 02 h 30' 00" is being reproduced, and the seek bar is kept depressed for more than the predetermined time at the position corresponding to 01 h 06' 15". In this case, the "second"-setting adjustment circle 212 is displayed. The "second"-setting adjustment circle 212 covers one minute from 01 h 06' 00" to 01 h 07' 00". As shown in FIG. 7, the position of 15 seconds corresponds to the 01 h 06' 15" point of the video, and the position of 30 seconds corresponds to the 01 h 06' 30" point of the video. As can be seen from this, the "second"-setting adjustment circle 212 represents a partial period, which is part of the finite time period, namely, the length of the video. This partial period includes the selection point corresponding to the position on the seek bar 202 which is an example of a first display.

After the processing in step S401, the processing flow advances to step S402. In step S402, the controller 10 determines whether or not a unit enlargement operation is performed. The unit enlargement operation corresponds to the pinch-out operation shown in FIG. 8, for example. The pinch-out means that two points on the touch panel are slid in such a manner as to increase the distance therebetween. If it is determined in step S402 that the unit enlargement operation is not performed, the processing flow advances to step S403.

In step S403, the controller 10 performs a time adjustment operation. To be specific, the controller 10 determines whether or not the "second"-setting adjustment circle 212 is touched. If the "second"-setting adjustment circle 212 is touched, the video is reproduced in accordance with the touched position. For example, as shown in FIG. 7, when the position corresponding to 01 h 06' 15" is touched, the 01 h 06' 15" point of the video is reproduced. For example, when the position corresponding to 01 h 06' 40" of the "second"-setting adjustment circle is touched, the 01 h 06' 40" point of the video is reproduced. When the "second"-setting adjustment circle 212 is slid in such a manner as to rotate clockwise, the reproduction position moves forward in accordance with the touched position. Conversely, when the "second"-setting adjustment circle 212 is slid in such a manner as to rotate counterclockwise, the reproduction position moves backward in accordance with the touched position. When the "second"-setting adjustment circle is slid clockwise in such a manner as to make one rotation and the position of 0 seconds is touched, the 01 h 07' 00" point of the video is reproduced. Thereafter, the "second"-setting adjustment circle 212 covers a subsequent one minute from 01 h 07' 00" to 01 h 08' 00". After the processing in step S403, the processing flow advances to step S404.

In step S404, the controller 10 determines whether or not a predetermined period has elapsed without any operation being performed. If it is determined that the predetermined period has not elapsed, the processing flow returns to step S401. If it is determined that the predetermined period has elapsed, the adjustment circle display processing is ended, and the processing flow returns to the touch operation processing. The adjustment circle disappears at the time.

If it is determined in step S402 that the unit enlargement operation is performed, the processing flow advances to step S405. In step S405, the controller 10 determines whether or not the length of a video file is one minute or more. If it is determined that the length of the video file is not one minute or more, the processing flow returns to step S401. That is, the unit is not enlarged. If it is determined that the length of the video file is one minute or more, the processing flow advances to step S406.

In step S406, the controller 10 displays a "minute"-setting adjustment circle on the display 20. FIG. 9 shows an example of the screen 210 on which a video is being reproduced, with the "minute"-setting adjustment circle. As shown in FIG. 9, the seek bar 202 and the "minute"-setting adjustment circle 214 are displayed in the screen 210 on which a video is being reproduced.

The "minute"-setting adjustment circle 214 is a circular GUI, as shown in FIG. 9. The direction corresponding to the "0 o'clock" represents zero minutes, the direction corresponding to the "3 o'clock" represents 15 minutes, the direction corresponding to the "6 o'clock" represents 30 minutes, and the direction corresponding to the "9 o'clock" represents 45 minutes. For example, let us assume that the "minute"-setting adjustment circle 214 is displayed when the 00 h 45' 10" portion of a video file whose reproduction time is 01 h 40' 15" is being reproduced. The "minute"-setting adjustment circle 214 covers one hour from 00 h 00' 00" to 01 h 00' 00". As shown in FIG. 9, the position of 15 minutes corresponds to the 00 h 15' 00" point of the video, and the position of 30 minutes corresponds to the 00 h 30' 00" point of the video. After the processing in step S406, the processing flow advances to step S407.

In step S407, the controller 10 determines whether or not a unit enlargement operation is performed. If it is determined that the unit enlargement operation is not performed, the processing flow advances to step S408.

In step S408, the controller 10 determines whether or not a unit reduction operation is performed. The unit reduction operation corresponds to the pinch-in operation shown in FIG. 10, for example. The pinch-in means that two points on the touch panel are slid in such a manner as to decrease the distance therebetween. If it is determined in step S408 that the unit reduction operation is performed, the processing flow returns to step S401. That is, the "second"-setting adjustment circle 212 is displayed on the display 20. If it is determined that the unit reduction operation is not performed, the processing flow advances to step S409.

In step S409, the controller 10 performs a time adjustment operation. To be specific, the controller 10 determines whether or not the "minute"-setting adjustment circle 214 is touched. If the "minute"-setting adjustment circle 214 is touched, the video is reproduced in accordance with the touched position. For example, as shown in FIG. 9, when the position corresponding to 00 h 45' 10" is touched, the 00 h 45' 10" point of the video is reproduced. For example, when the position corresponding to 00 h 36' 25" of the "minute"-setting adjustment circle 214 is touched, the 00 h 36' 25" point of the video is reproduced. When the "minute"-setting adjustment circle slid clockwise in such a manner as to make one rotation and the position of 0 minutes is touched, the 1 h 0' 0" point of the video is reproduced. Thereafter, the "minute"-setting adjustment circle 214 covers a subsequent one hour from 01 h 00' 00" to 02 h 00' 00". After the processing in step S409, the processing flow advances to step S410.

In step S410, the controller 10 determines whether or not a predetermined period has elapsed without any operation being performed. If it is determined that the predetermined period has not elapsed, the processing flow returns to step S406. If it is determined that the predetermined period has elapsed, the adjustment circle display processing is ended, and the processing flow returns to the touch operation processing. The adjustment circle disappears at the time.

If it is determined in step S407 that the unit enlargement operation is performed, the processing flow advances to step S411. In step S411, the controller 10 determines whether or not the length of a video file is one hour or more. If it is determined that the length of the video file is not one hour or more, the processing flow advances to step S408. That is, the unit is not enlarged. If it is determined that the length of the video file is one hour or more, the processing flow advances to step S412.

In step S412, the controller 10 displays an "hour"-setting adjustment circle on the display 20. FIG. 11 shows an example of the screen 210 on which a video is being reproduced, with the "hour"-setting adjustment circle. As shown in FIG. 11, the seek bar 202 and the "hour"-setting adjustment circle 216 are displayed in the screen 210 on which a video is being reproduced.

The "hour"-setting adjustment circle 216 is a circular GUI, as shown in FIG. 11. The upward direction of the circle represents zero hours. The time represented by the whole circumference varies depending upon how long a video file is. If the length of the video file is one hour or more and is less than two hours, the whole circumference of the circle represents two hours. Likewise, if the length of the video file is not less than two hours and is less than three hours, the whole circumference of the circle represents three hours. Likewise, if the length of the video file is not less than n hours (n: a natural number) and is less than (n+1) hours, the whole circumference of the circle represents (n+1) hours. After the processing in step S412, the processing flow advances to step S413.

In step S413, the controller 10 determines whether or not a unit reduction operation is performed. If it is determined that the unit reduction operation is performed, the processing flow returns to step S406. That is, the "minute"-setting adjustment circle 214 is displayed on the display 20. If it is determined that the unit reduction operation is not performed, the processing flow advances to step S414.

In step S414, the controller 10 performs a time adjustment operation. To be specific, the controller 10 determines whether or not the "hour"-setting adjustment circle 216 is touched. If the "hour"-setting adjustment circle 216 is touched, the video is reproduced in accordance with the touched position. For example, as shown in FIG. 11, when the position corresponding to 00 h 56' 05" is touched, the 00 h 56' 05" point of the video is reproduced. If a position corresponding to a time longer than the reproduction time of the video file is touched, such a touch operation is ignored. After the processing in step S414, the processing flow advances to step S415.

In step S415, the controller 10 determines whether or not a predetermined period has elapsed without any operation being performed. If it is determined that the predetermined period has not elapsed, the processing flow returns to step S412. If it is determined that the predetermined period has elapsed, the adjustment circle display processing is ended, and the processing flow returns to the touch operation processing. The adjustment circle disappears at the time.

Figure 12:
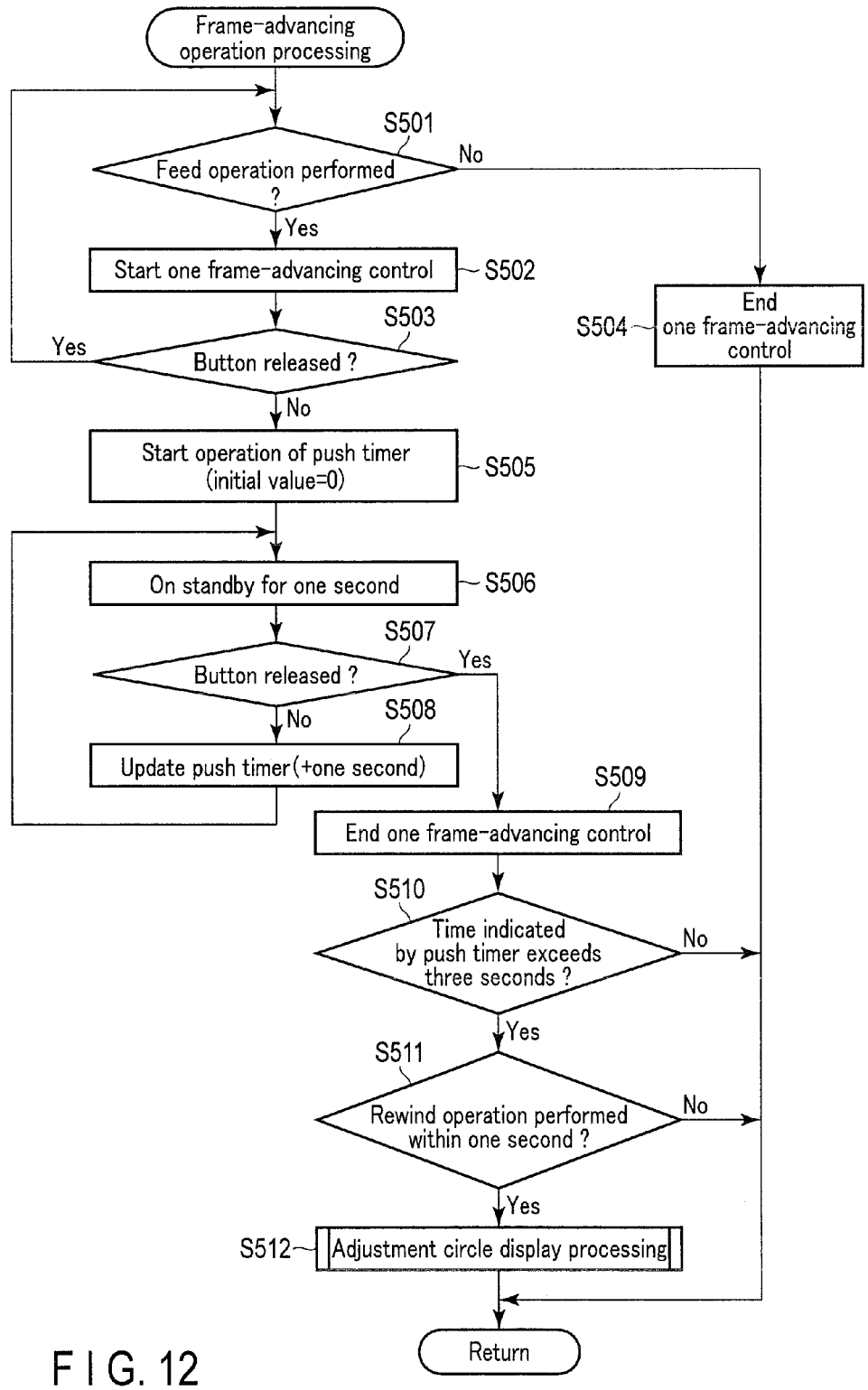
FIG. 12 is a flowchart illustrating an example of a frame-advancing operation processing according to the embodiment.

The frame-advancing operation processing performed in step S218 of the reproduction operation processing will be described, referring to the flowchart shown in FIG. 12.

Figure 13:
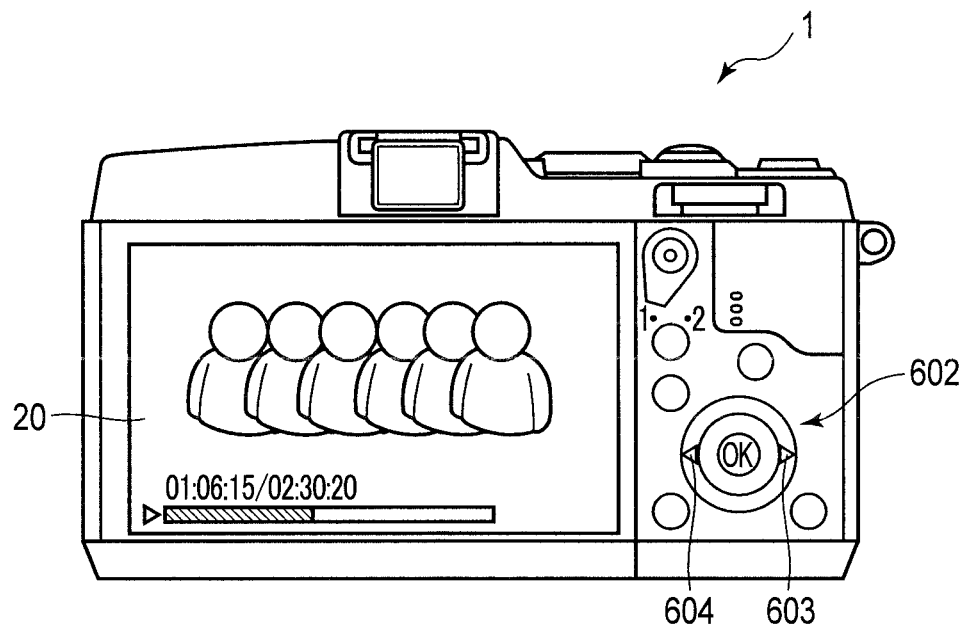
FIG. 13 is a diagram for explaining an example of a frame-advancing operation.

In step S501, the controller 10 determines whether or not a feed operation is performed. The feed operation is an operation of depressing the right button 603 of the operation button 602, which is one element of the input unit 60, as shown in FIG. 13, for example. If it is determined that the feed operation is performed, the processing flow advances to step S502.

In step S502, the controller 10 starts one frame-advancing control. In other words, the controller 10 starts the one frame-advancing control, by which the video to be displayed on the display 20 is moved forward in units of one frame.

In step S503, the controller 10 determines whether or not the button used for the feed operation is released. If it is determined that the button is released, the processing flow returns to step S501. If it is determined that the button is not released, the processing flow advances to step S505.

If it is determined in step S501 that the feed operation is not performed, the processing flow advances to step S504. In step S504, the controller 10 ends the one frame-advancing control. As described above, when the right button 603 for the feed operation is depressed, the one frame-advancing operation is performed for the video displayed on the display 20. When the right button 603 is released, the one frame-advancing operation for the video displayed on the display 20 is ended. After the processing in step S504, the frame-advancing operation is ended, and the processing flow returns to the reproduction operation processing.

In step S505, the controller 10 starts the operation of a push timer. The push timer is a timer indicating a time for which the button for the feed operation is kept depressed. The initial value of the push timer is 0.

In step S506, the controller 10 is on standby for one second.

In step S507, the controller 10 determines whether or not the button used for the feed operation is released. If it is determined that the button is not released, the processing flow advances to step S508.

In step S508, the controller 10 updates the push timer. To be more specific, the time indicated by the timer is incremented by one second. Subsequently, the processing flow returns to step S506. As can be understood from the above, the push timer counts up as long as the button is kept depressed.

If it is determined in step S507 that the button is released, the processing flow advances to step S509.

In step S509, the controller 10 ends the one frame-advancing control. As described above, the one frame-advancing operation is kept performed for the video displayed on the display 20 while the right button 603 is kept depressed. The one frame-advancing operation is ended when the right button 603 is released. After the processing in step S509, the processing flow advances to step S510.

In step S510, the controller 10 determines whether or not the time indicated by the push timer exceeds three seconds. If it is determined that the time does not exceed three seconds, the frame-advancing operation is ended, and the processing flow returns to the reproduction operation processing. If it is determined that the time exceeds three seconds, the processing flow advances to step S511.

In step S511, the controller 10 determines whether or not a rewind operation is performed within one second. The rewind operation is, for example, an operation of depressing the left button 604 of the operation button 602. If it is determined that the rewind operation is not performed within one second, the frame-advancing operation is ended, and the processing flow returns to the reproduction operation processing. If it is determined that the rewind operation is performed within one second, the processing flow advances to step S512.

In step S512, the controller 10 performs adjustment circle display processing. The adjustment circle display processing is processing described with reference to FIG. 6. That is, the one frame-advancing operation is kept performed while the right button 603 is kept depressed, and is ended when the right button 603 is released. Where the frame-advancing operation continues for three seconds or more, and the rewind operation is performed immediately after the frame-advancing operation, an adjustment circle is displayed. Where the rewind operation is performed after the frame-advancing operation continues for three seconds or more, it is assumed that the user advances the frame more than necessary and wishes to rewind the frame. In other words, it is assumed that the user intends to make fine adjustment. The adjustment circle is displayed in this situation, and the user can make fine adjustment, using the adjustment circle. Displaying the adjustment circle in such a situation and enabling the fine adjustment is considered very useful in practice.

Figure 14:
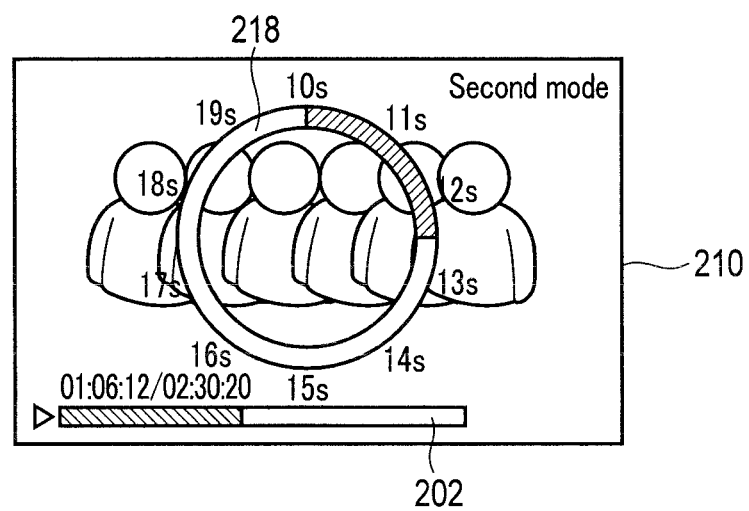
FIG. 14 shows an example of a display image according to the embodiment and illustrates an example of a "second"-setting adjustment circle.

FIG. 14 shows an example of the adjustment circle displayed in the adjustment circle display processing of step S512. When an operation is performed during the frame-advancing operation, it is probable that the user intends to make a detailed change or fine adjustment. As shown in FIG. 14, therefore, the adjustment circle 218 displayed in this case is configured such that the whole circumference represents ten seconds. Using this adjustment circle 218, the user can determine a reproduction point of the video with accuracy.

After the adjustment circle processing, the frame-advancing operation is ended, and the processing flow returns to the reproduction operation processing.

Figure 15:
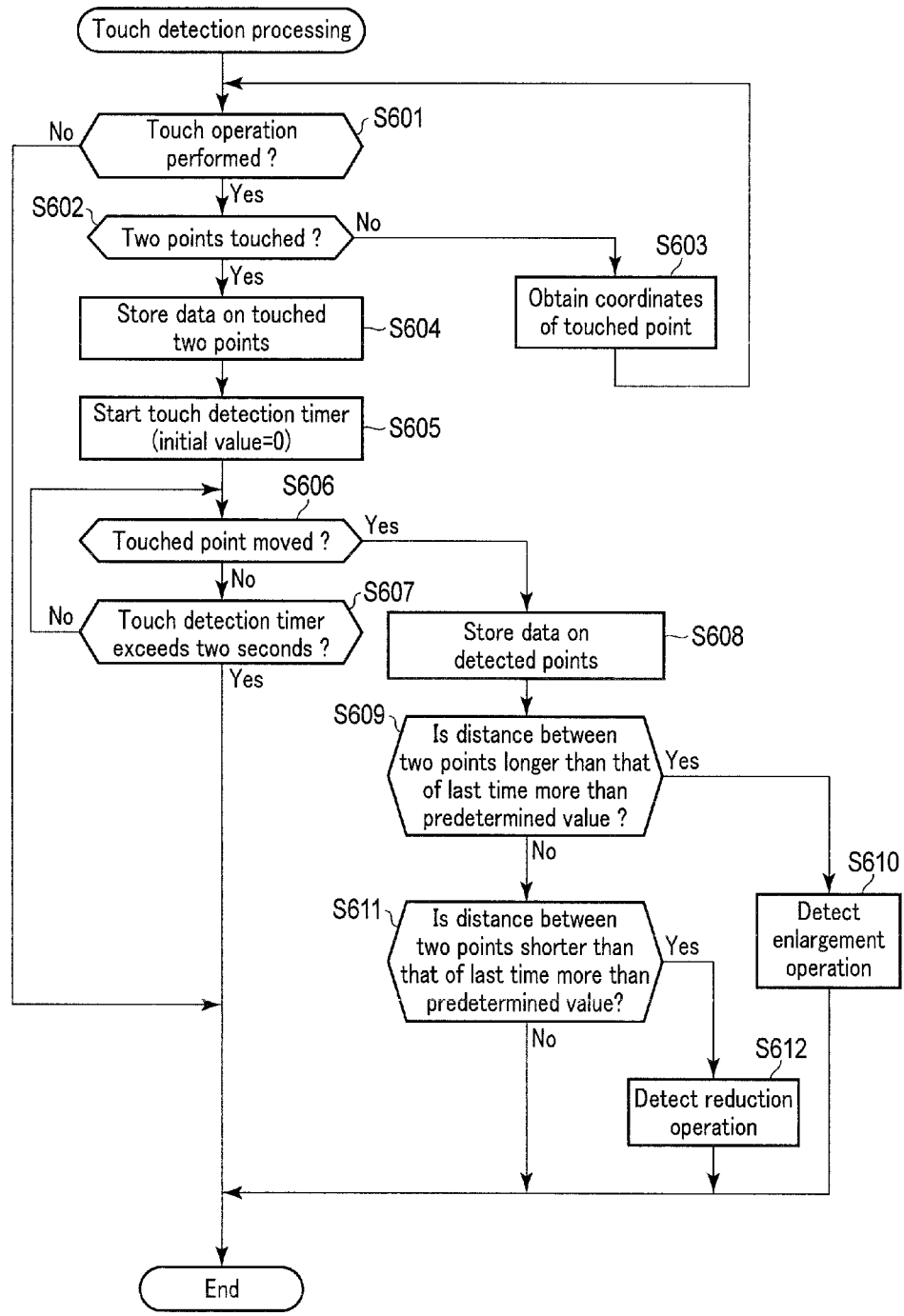
FIG. 15 is a flowchart illustrating an example of touch detection processing according to the embodiment.

The touch detection processing performed in each processing will be described, referring to the flowchart shown in FIG. 15.

In step S601, the controller 10 determines whether or not a touch operation is performed. If it is determined that the touch operation is not performed, the touch detection processing is ended. If it is determined that the touch operation is performed, the processing flow advances to step S602.

In step S602, the controller 10 determines whether or not two points are touched. If it is determined that two points are not touched, the processing flow advances to step S603. In other word, if it is determined that only one point is touched, the processing flow advances to step S603. In step S603, the controller 10 obtains coordinates of the touched one point. Subsequently, the processing flow returns to step S601. When one point is kept touched, the coordinates of the touched point are sequentially obtained.

If it is determined in step S602 that two points are touched, the processing flow advances to step S604. In step S604, the controller 10 stores data on the touched two points as touch points. In step S605, the controller 10 starts the operation of a touch detection timer. The touch detection timer is a timer which counts up an elapsed time from the time of the touch operation. The initial value of the touch detection timer is 0.

In step S606, the controller 10 determines whether or not at least one of the touched two points is moved. If it is determined that at least one of the touched two points is not moved, the processing flow advances to step S607. In step S607, the controller 10 determines whether or not the time indicated by the touch detection timer exceeds two seconds. If it is determined that the time of the touch detection timer is less than two seconds, the processing flow returns to step S606. If it is determined that the time indicated by the touch detection timer exceeds two seconds, the touch detection processing is ended. In other words, if the two points are touched and neither of the two points is moved in two or more seconds, the touch detection processing is ended.

If it is determined in step S606 that at least one of the touched two points is moved, the processing flow advances to step S608. In step S608, the controller 10 stores data on the detected two points.

In step S609, the controller 10 determines whether or not the distance between the detected two points is longer than that of the last time by more than a predetermined value. If it is determined that the distance is longer than that of the last time, the processing flow advances to step S610. In step S610, the controller 10 detects that an enlargement operation is performed. Then, the touch detection processing is ended.

If it is determined in step S609 that the distance between the detected two points is not longer than that of the last time by more than the predetermined value, the processing flow advances to step S611. In step S611, the controller 10 determines whether or not the distance between the detected two points is shorter than that of the last time by more than a predetermined value. If it is determined that the distance is shorter than that of the last time, the processing flow advances to step S612. In step S612, the controller 10 detects that a reduction operation is performed. Then, the touch detection processing is ended.

If it is determined in step S611 that the distance between the detected two points is not shorter than that of the last time by more than the predetermined value, the touch detection processing is ended.

As described above, according to the present embodiment, the adjustment circle is displayed in response to the seek bar 202 being depressed for a long time, and fine adjustment of the reproduction position can be easily made using the adjustment circle in place of the seek bar 202.

When a rewind operation is performed during the frame-advancing operation, the adjustment circle is displayed, and fine adjustment of the reproduction position can be easily made using the adjustment circle.

Unlike the linearly-extending seek bar, the adjustment circle is advantageously used for a successively repeating operation since the touched position returns to the original position after it is rotated once along the adjustment circle. For example, in the case of the "second"-setting adjustment circle 212, when the touched position makes one rotation, the reproduction position moves forward by one minute. A successive operation can be easily performed by moving the touched position in this manner. Each time the touched position makes one rotation, the reproduction position represented by the "second"-setting adjustment circle 212 is changed, accordingly. The number of rotations may be displayed along with the "second"-setting adjustment circle 212. For example, the current position represented in an upper level unit may be indicated within the adjustment circle, as in an analog clock. To be more specific, the "second"-setting adjustment circle 212 may be configured to move as if it were a second hand, and the display indicating the number of rotations may be shown as if it were a minute hand.

In the present embodiment, the "minute" and "second" positions of the adjustment circle are like those of an analog clock. Therefore, the user can intuitively understand the "minute" and "second" and positions indicating them, and can intuitively perform operations.

[First Modification]

The first modification will be described. In the description below, reference will be made to how the first modification differs from the above-mentioned embodiment. Therefore, the same symbols will be used to denote structural elements similar or corresponding to those of the above embodiment, and a description of such structural elements will be omitted. The first modification differs from the above embodiment in the touch operation processing. To be specific, in the above-mentioned embodiment, an adjustment circle is displayed on the display 20 in response to the seek bar 202 being depressed for more than a predetermined time. In the first modification, in contrast, an adjustment circle is displayed on the display 20 in response to the seek bar being repeatedly touched. Where the seek bar 202 is repeatedly touched a number of times, it can be assumed that the reproduction position desired by the user cannot be designated using the seek bar 202. In such a case, the first modification displays an adjustment circle having a higher resolution than that of the seek bar 202.

Figure 16:
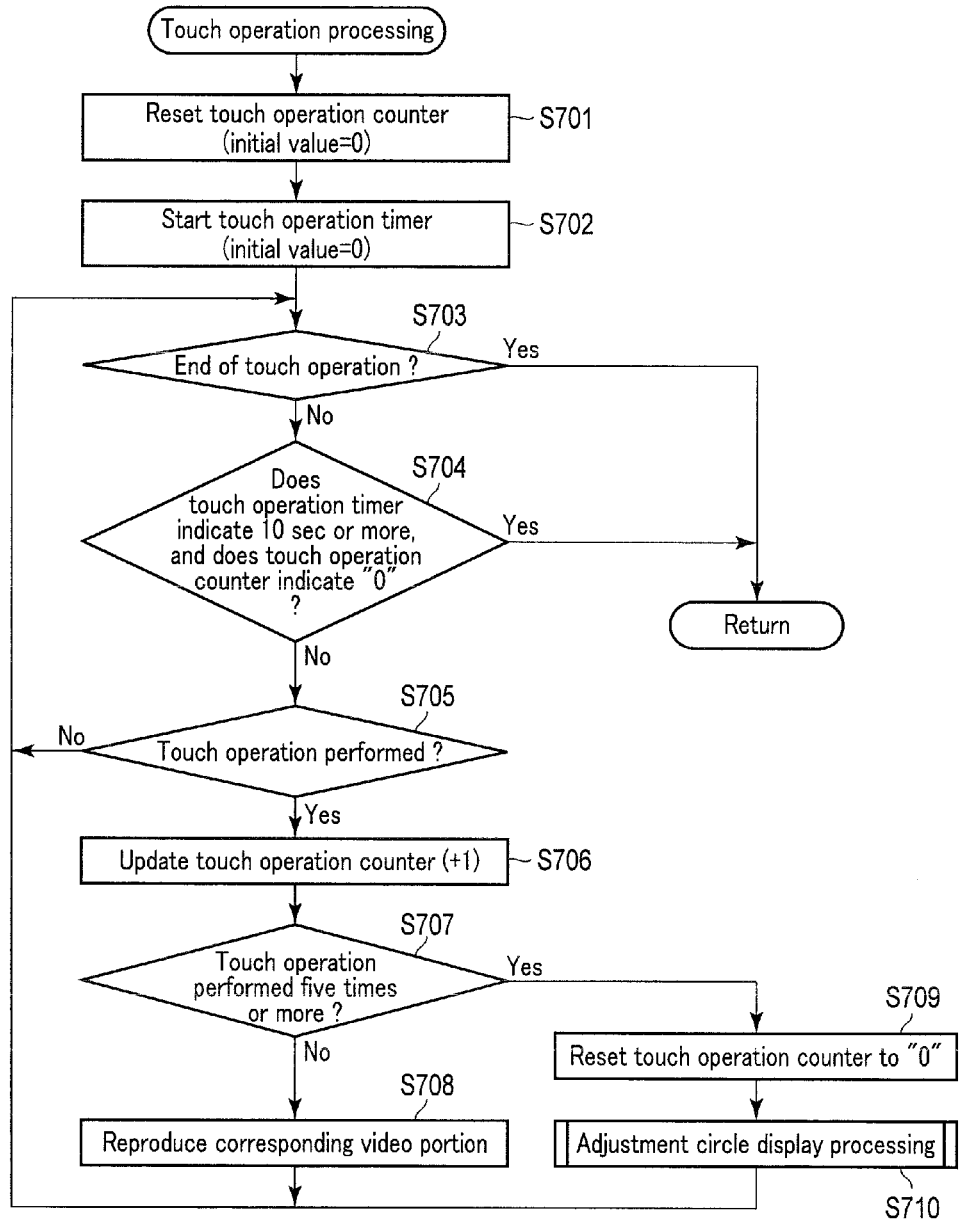
FIG. 16 is a flowchart illustrating another example of touch operation processing according to the embodiment.

The touch operation processing according to the first modification will be described with reference to the flowchart shown in FIG. 16.

In step S701, the controller 10 resets a touch operation counter. The touch operation counter is a counter for counting how many times a touch operation is performed. In step S701, the touch operation counter is set to store "0" as an initial value.

In step S702, the controller 10 starts the operation of a touch operation timer. The touch operation timer is a timer which counts up an elapsed time. The initial value of the touch operation time is set as 0 seconds.

In step S703, the controller 10 determines whether or not a touch operation ends. If it is determined that the touch operation ends, the touch operation processing is ended. If it is determined that the touch operation does not end, the processing flow advances to step S704.

In step S704, the controller 10 determines whether or not the touch operation timer indicates 10 seconds or more and whether or not the touch operation counter indicates 0 times. If it is determined that the touch operation timer indicates 10 seconds or more and that the touch operation counter indicates "0", the touch operation processing is ended. If it is determined that the touch operation timer indicates less than 10 seconds and that the touch operation counter does not indicate "0", the processing flow advances to step S705.

In step S705, the controller 10 determines whether or not a touch operation is performed. If it is determined that the touch operation is not performed, the processing flow returns to step S703. If it is determined that the touch operation is performed, the processing flow advances to step S706.

In step S706, the controller 10 updates the touch operation counter to increment the count by "1."

In step S707, the controller 10 refers to the touch operation counter and determines whether or not the touch operation is performed five times or more. If it is determined that the touch operation is not performed five times or more, the processing flow advances to step S708.

In step S708, the controller 10 reproduces the video from the portion corresponding to the touch operation. Subsequently, the processing flow returns to step S703.

If it is determined in step S707 that the touch operation is performed five times or more, the processing flow advances to step S709. In step S709, the controller 10 resets the touch operation counter to "0." In step S710, the controller 10 performs adjustment circle display processing. The adjustment circle display processing is processing described with reference to FIG. 6. At the end of the adjustment circle display processing, the processing flow returns to step S703.

The time period indicated by the adjustment circle displayed in step S710 can be determined properly. For example, the "six o'clock" position, which is the middle of the time period indicated by the adjustment circle, may be an average of five touched points or an average of the two points touched last. Alternatively, it may be the point touched last. For example, if the five touched positions are moved forward or rearward with respect to a certain point, the middle of the time period indicated by the adjustment circle may be determined by averaging points larger than five. If the five touched positions are gradually moved in the same direction, the middle of the time period indicated by the adjustment circle may be the points touched last.

In the touch operation processing of the first modification, the adjustment circle is displayed when the user sequentially touches the seek bar five times. If the seek bar is sequentially touched five times, it is assumed that the user cannot properly select the portion of a video which the user would like to reproduce. Since the adjustment circle is displayed in such a situation, the user can easily select the video portion which the user would like to reproduce.

In the above example, reference was made to the case where the touch operation is performed five times. The touch operations are assumed to be repetition of the following two operations: the operation of touching the touch panel 30 with a finger, and the operation of separating the finger from the touch panel 30. However, the present invention is not limited to this example. For example, a finger is kept touched on the touch panel 30 is slid, and the time when the sliding direction of that finger changes may be counted as one touch operation. For example, when the touched position moves to the right and then moves to the left, this condition may be counted as two touch operations. In addition, when the touched position moves to the right, temporarily stops, and moves again to the right, this condition may be counted as two touch operations.

[Second Modification]

The second modification of the above embodiment will be described. In the description below, reference will be made to how the second modification differs from the above-mentioned embodiment. Therefore, the same symbols will be used to denote structural elements similar or corresponding to those of the above embodiment, and a description of such structural elements will be omitted. In connection with the second modification, a description will be given of an adjustment circle having a pattern different from that mentioned in the above-described embodiment.

FIG. 17 illustrates an example of a "second"-setting adjustment circle. For example, when a position on the seek bar 202 is kept depressed for more than a predetermined time, the "second"-setting adjustment circle 222 is displayed. The "0 o'clock" position of the "second"-setting adjustment circle 222 corresponds to the position at which the seek bar 202 is kept depressed for more than the predetermined time. For example, the "0 o'clock" position of the adjustment circle 213 displayed when the 1 h 06' 15" position of the seek bar 202 is kept depressed represents the 1 h 06' 15" position. When the adjustment circle 222 is slid clockwise, the video currently displayed moves forward. When the adjustment circle 222 is slid counterclockwise, the video currently displayed moves backward. For example, the whole circumference of the adjustment circle 222 represents one second. When the adjustment circle 222 is slid clockwise and makes one rotation, the video moves forward by one second. When the adjustment circle 222 is slid counterclockwise and makes one rotation, the video moves backward by one second. When, as shown in FIG. 17, the adjustment circle 222 is slid clockwise to the "3 o'clock" position, the video corresponding to 01 h 06' 15" 25 is reproduced.

FIG. 18 illustrates an example of a "second"-setting adjustment circle. For example, when the unit enlargement operation is performed in the state where the "second"-setting adjustment circle 22 is displayed, the "minute"-setting adjustment circle 224 is displayed, as shown in FIG. 18. The "0 o'clock" direction of the "minute"-setting adjustment circle 224 represents a time which is reproduced then. For example, the whole circumference of the adjustment circle 224 represents one minute. When the adjustment circle 224 is slid clockwise and makes one rotation, the video moves forward by one minute. When the adjustment circle 224 is slid counterclockwise and makes one rotation, the video moves backward by one minute.

FIG. 19 illustrates an example of an "hour"-setting adjustment circle. For example, when the unit enlargement operation is performed in the state where the "minute"-setting adjustment circle 224 is displayed, the "hour"-setting adjustment circle 226 is displayed, as shown in FIG. 19. The "0 o'clock" direction of the "hour"-setting adjustment circle 226 represents a time which is reproduced then. For example, the whole circumference of the adjustment circle 226 represents one hour. When the adjustment circle 226 is slid clockwise and makes one rotation, the video moves forward by one hour. When the adjustment circle 226 is slid counterclockwise and makes one rotation, the video moves backward by one hour.

The adjustment circle according to the second modification enables easy selection of a reproduction portion of a video.

The adjustment circle is not limited to the examples shown in FIG. 17 to FIG. 19. For example, the whole circumference of the adjustment circle does not have to represent one second, one minute or one hour. It may represent how the reproduction of a video is in progress because the touch panel is operated with a finger. For example, when the touch panel is operated, easy adjustment may be made within approximately 5° of the adjustment circle. In such a case, the angle of 5° of the adjustment circle may be associated with one frame of the video. If the video is displayed at 30 fps, the whole circumference of the adjustment ring corresponds to 2.4 seconds. Furthermore, an adjustment position and video frames before and after the adjustment may be superimposed. When a moving object is displayed, the images before and after movement may be superimposed. In this case, the object is displayed together with its residual images, and changes in the movement can be recognized.

The techniques described in connection with the embodiment and modifications are not limited to a digital camera; they are applicable to a PC and various types of mobile information terminals having the data reproduction function, such as a smart phone and a tablet PC. The data reproduction device does not have to comprise an imaging unit, and the techniques described in connection with the foregoing embodiment can be applied when a video file acquired by another apparatus is reproduced. The mobile information terminals include wearable terminals. Furthermore, the techniques described in connection with the embodiment are not limited to cameras for consumers; they are applicable to a monitoring camera, a camera for microscope, an industrial apparatus for inspection, and an observation apparatus used for medical purposes.

The techniques described above are not limited to successive videos but are applicable to a group of still images that are captured with time. For example, the techniques are applicable to the reproduction of a group of sports images that are taken in series during one game. For example, the techniques are applicable to a group of images captured at predetermined intervals over a long period of time, such as the images captured by a capsule endoscope.

The techniques describe above are not limited to the reproduction of a video file but are applicable to the reproduction of an audio file. That is, an IC recorder may be configured to implement the techniques. Needless to say, the file contents may be other than images and sound; they may be vibration or a light emission pattern.

The adjustment means described above is circular. However, the adjustment means is not limited to this. For example, the adjustment means may be in the form of a bar, just like the seek bar described above. As compared with a seek bar representing an overall video, a seek bar representing a portion of a video has a higher resolution since it represents a narrow range of the video. As a result, the same advantages as mentioned above are obtained. The adjustment means should preferably be circular since the circular adjustment means (namely, the adjustment circle) has a repetition characteristic.

Of the techniques described in connection with the above embodiment and modifications, the controls described with reference to flowcharts are realized as programs. Such programs can be stored in a recording medium or a recording unit. The programs can be recorded in the recording medium or recording unit in various ways. They may be recorded at the time of shipping a product, they may be recorded using a distributed recording medium, or they may be downloaded from the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data reproduction apparatus comprising:
a display which displays an image;
a touch panel which is provided for the display and detects a touched position as a touch position;
a recording unit in which time data relating to a plurality of times included in a finite time period and contents associated with the time data are recorded;
an output unit which outputs content, included in data recorded in the recording unit and selected as a reproduction target, based on the time data;
a display control unit which controls the display to show first display and second display, wherein the first display represents the finite time period and a reproduction point indicating the reproduction target in relation to the finite time period, and the second display represents a partial period which is part of the finite time period, and the reproduction point in relation to the partial period, the second display being shown when a touch operation detected by the touch panel is a first touch operation;
an output controller which controls the output unit to output the content corresponding to the reproduction point in accordance with the touch position, when the touch position is on the first display or on the second display; and
a unit change operation determining unit which determines that a unit change operation has been performed based on the touch operation detected by the touch panel,
wherein the display controller causes the second display to be shown in a region including an area in which the image is displayed,
the second display comprises a plurality of types of adjustment displays which correspond to units indicating periods, wherein the partial period is set for each of the adjustment displays,
the display control unit changes the adjustment displays of the second display in accordance with the unit change operation determined by the unit change operation determining unit,
the unit change operation determining unit determines that the unit change operation has been performed when a pinch-out or pinch-in operation is detected,
the display control unit updates the second display to one of the adjustment displays that represents the partial period in which the unit is larger when both (1) the pinch-out is detected and (2) the finite time period is longer than a predetermined period, and
the display control unit updates the second display to one of the adjustment displays that represents the partial period in which the unit is smaller when the pinch-in is detected.

2. The data reproduction apparatus according to claim 1, wherein the second display is circular.

3. The data reproduction apparatus according to claim 2, wherein the display controller changes the partial period to be displayed on the display, when the touch position moves on the second display in such a manner as to make one rotation.

4. The data reproduction apparatus according to claim 3, wherein the second display includes display indicating how many times the touch position is rotated on the second display.

5. The data reproduction apparatus according to claim 1, wherein the first touch operation is an operation of continuing to touch the first display for more than a predetermined time.

6. The data reproduction apparatus according to claim 1, wherein the first touch operation is an operation of repeatedly touching the first display a predetermined number of times within a predetermined period, or an operation of sliding the first display a predetermined number of times within the predetermined period.

7. The data reproduction apparatus according to claim 1, wherein
the first touch operation is performed on the first display,
the touch position of the first touch operation corresponds to a selection point included in the finite time period, and
the partial period is a period including the selection point.

8. The data reproduction apparatus according to claim 1, wherein the second display is semitransparent.

9. The data reproduction apparatus according to claim 1, wherein the data is video data, and the output unit includes the display.

10. The data reproduction apparatus according to claim 1, wherein the data is sound data, and the output unit includes a speaker.

11. The data reproduction apparatus according to claim 1, wherein the data is still picture data, and the output unit includes the display.

12. The data reproduction apparatus according to claim 1, wherein
the second display includes a plurality of third displays, each of the third displays representing a partial period, which is part of the finite time period, and a reproduction point in relation to the partial period, and the third displays differing from one another in manners in which the time data expressed as a unit length on the display is indicated, and
the display control unit selects a third display from the third displays shown in the display in accordance with a change of a distance of the touch positions detected by the touch panel.

13. The data reproduction apparatus according to claim 1, further comprising:
an OSD storage in which the first display and the second display are stored as an OSD.

14. The data reproduction apparatus according to claim 1, wherein,
the second display includes a circular adjustment display, and
the display control unit displays, on the display, the adjustment display in which the reproduction point when the first touch operation is detected or the unit change operation is detected corresponds to a 0 o'clock direction.

15. A control method for a data reproduction apparatus including a display which displays an image, a touch panel which is provided for the display and detects a touched position as a touch position, a recording unit in which time data relating to a plurality of times included in a finite time period and contents associated with the time data are recorded, and an output unit which outputs content, included in the data recorded in the recording unit and selected as a reproduction target, based on the time data, the control method comprising:

causing the display to show first display representing the finite time period and a reproduction point indicating the reproduction target in relation to the finite time period;

causing the display to show second display representing a partial period which is part of the finite time period, and the reproduction point in relation to the partial period, the second display being shown on a region including an area in which the image is displayed, when the touch operation detected by the touch panel is a first touch operation;

causing the output unit to output the content corresponding to the reproduction point in accordance with the touch position, when the touch position is on the first display or on the second display;

determining that a unit change operation has been performed when a pinch-out or pinch-in operation is detected based on the touch operation detected by the touch pane; and changing a plurality of types of adjustment displays of the second display in accordance with the unit change operation, the adjustment displays corresponding to units indicating periods, wherein the partial period is set for each of the adjustment displays and wherein the second display is updated to one of the adjustment displays that represents the partial period in which the unit is larger when both (1) the pinch-out is detected and (2) the finite time period is longer than a predetermined period, and is updated to one of the adjustment displays that represents the partial period in which the unit is smaller when the pinch-in is detected.

16. A non-transitory computer-readable recording medium that stores a control program for controlling a data reproduction apparatus including a display which displays an image, a touch panel which is provided for the display and detects a touched position as a touch position, a recording unit in which time data relating to a plurality of times included in a finite time period and contents associated with the time data are recorded, and an output unit which outputs content, included in the data recorded in the recording unit and selected as a reproduction target, based on the time data, the recording medium storing:

code that causes the display to show first display representing the finite time period and a reproduction point indicating the reproduction target in relation to the finite time period;

code that causes the display to show second display representing a partial period which is part of the finite time period, and the reproduction point in relation to the partial period, the second display being shown on a region including an area in which the image is displayed, when the touch operation detected by the touch panel is a first touch operation;

code that causes the output unit to output the content corresponding to the reproduction point in accordance with the touch position, when the touch position is on the first display or on the second display;

code for determining that a unit change operation has been performed when a pinch-out or pinch-in operation is detected based on the touch operation detected by the touch panel; and code for changing a plurality of types of adjustment displays of the second display in accordance with the unit change operation, the adjustment displays corresponding to units indicating periods, wherein the partial period is set for each of the adjustment displays and wherein the second display is updated to one of the adjustment displays that represents the partial period in which the unit is larger when both (1) the pinch-out is detected and (2) the finite time period is longer than a predetermined period, and is updated to one of the adjustment displays that represents the partial period in which the unit is smaller when the pinch-in is detected.

* * * * *